United States Patent
Lee et al.

(10) Patent No.: US 6,933,679 B2
(45) Date of Patent: Aug. 23, 2005

(54) APPARATUS AND METHOD FOR DRIVING PLASMA DISPLAY PANEL

(75) Inventors: Jun-Young Lee, Cheonan (KR); Hak-Ki Choi, Cheonan (KR); Chan-Young Han, Asan (KR)

(73) Assignee: Samsung SDI Co., Ltd., Suwon (KR)

(*) Notice: Subject to any disclaimer, the term of this patent is extended or adjusted under 35 U.S.C. 154(b) by 40 days.

(21) Appl. No.: 10/687,623

(22) Filed: Oct. 20, 2003

(65) Prior Publication Data

US 2004/0080277 A1 Apr. 29, 2004

(30) Foreign Application Priority Data

Oct. 22, 2002 (KR) .............................. 10-2002-0064481

(51) Int. Cl.[7] .................................................. G09G 3/10
(52) U.S. Cl. ..................................... 315/169.4; 345/60
(58) Field of Search ......................... 315/169.1, 169.4; 345/211–212, 41–42, 60, 67

(56) References Cited

U.S. PATENT DOCUMENTS

| | | | | |
|---|---|---|---|---|
| 5,786,794 A | * | 7/1998 | Kishi et al. ................... 345/60 |
| 6,175,192 B1 | * | 1/2001 | Moon ..................... 315/169.3 |
| 6,281,635 B1 | * | 8/2001 | Lee .......................... 315/169.4 |
| 6,633,285 B1 | * | 10/2003 | Kigo et al. ................. 345/204 |
| 6,707,258 B2 | * | 3/2004 | Lee .......................... 315/169.3 |
| 6,741,238 B2 | * | 5/2004 | Choi ......................... 345/211 |
| 6,806,655 B2 | * | 10/2004 | Choi ....................... 315/169.3 |
| 2003/0025459 A1 | * | 2/2003 | Lee et al. ................. 315/169.3 |
| 2003/0156081 A1 | * | 8/2003 | Kang ......................... 345/60 |

FOREIGN PATENT DOCUMENTS

JP    2002-062844    2/2002    .......... G09G/3/288

* cited by examiner

*Primary Examiner*—Thuy Vinh Tran
(74) *Attorney, Agent, or Firm*—McGuireWoods LLP

(57) ABSTRACT

A method for driving a plasma display panel, by alternately applying a first voltage and a second voltage to a panel capacitor formed between a first electrode and a second electrode. A first switch and a second switch coupled between a first terminal of the panel capacitor and a first power source for supplying the first voltage are turned off. A second voltage is applied to the first terminal of the panel capacitor. A first electric path between a contact of the first switch and the second switch, and a third voltage is formed. The third voltage being a voltage between the first voltage and the second voltage, where a first capacitor formed between both terminals of the first switch has a lower capacitance than a second capacitor formed between both terminals of the second switch.

20 Claims, 10 Drawing Sheets

APPARATUS AND METHOD FOR DRIVING PLASMA DISPLAY PANEL

CROSS REFERENCE TO RELATED APPLICATION

This application claims priority to and the benefit of Korean Patent Application No. 2002-64481 filed on Oct. 22, 2002 in the Korean Intellectual Property Office, the content of which is incorporated herein in its entirety by reference.

BACKGROUND OF THE INVENTION (a) Field of the Invention

The present invention relates to an apparatus and method for driving a plasma display panel (PDP).

(b) Description of the Related Art

The PDP is a flat panel display that uses plasma generated by gas discharge to display characters or images and includes, according to its size, more than several scores to millions of pixels arranged in a matrix pattern. PDPs may be classified as direct current (DC) type or alternating current (AC) type according to its discharge cell structure and the waveform of the driving voltage applied thereto.

The method for driving the AC PDP generally includes a reset period, an addressing period, a sustain period, and an erase period, in temporal sequence.

The reset period is for initiating the status of each cell so as to facilitate the addressing operation. The addressing period is for selecting cells to be turned on or off and applying an address voltage to the turn-on cells to be timed on (i.e., addressed cells) to accumulate wall charges. The sustain period is for applying sustain pulses and causing a discharge for displaying an image on the addressed cells. The erase period is for reducing the wall charges of the cells to terminate the sustain.

In AC PDPs, the scan electrodes and the sustain electrodes act as a capacitance load, so a capacitance for the scan electrodes and sustain electrodes exists and that capacitance is equivalently represented by a panel capacitor. (Japanese Patent No. 3201603) (hereinafter JP '603) discloses a driver circuit for applying sustain pulses to the panel capacitor.

The driver circuit disclosed in JP '603 alternately applies voltages $V_s/2$ and $-V_s/2$ to the Y electrode of the panel capacitor by using a capacitor and a power source for supplying a voltage $V_s/2$ that is one-half of the voltage $V_s$ necessary for the sustain. More specifically, the driver circuit applies a voltage of $V_s/2$ to the Y electrode of the panel capacitor through the power source, and charges a voltage $V_s/2$ in the capacitor. Then, the capacitor is coupled between the ground terminal and the Y electrode of the panel capacitor to apply a voltage $-V_s/2$ to the Y electrode of the panel capacitor.

In this manner, the positive (+) voltage $+V_s/2$ and the negative (−) voltage $-V_s/2$ can be alternately applied to the Y electrode. Likewise, the positive (+) voltage $+V_s/2$ and the negative (−) voltage $-V_s/2$ can be alternately applied to the X electrode. The respective voltages $\pm V_s/2$ applied to the X and Y electrodes are phase-inverted with respect to each other, so the voltage $V_s/2$ necessary for a sustain is applied to both terminals of the panel capacitor.

The driver circuit disclosed in JP '603 can only be used for the plasma display panel using a pulse which swings between $-V_s/2$ and $V_s/2$, and the withstand voltage of transistors cannot be sustained at $V_s/2$ because of the characteristic of the transistors. Moreover, this circuit requires a capacitor with a high capacity for storing a voltage used for the negative (−) voltage and causes a considerable amount of inrush current during the starting due to the capacitor.

SUMMARY OF THE INVENTION

In one aspect of the present invention, there is provided an apparatus for driving a plasma display panel that includes a first switch, a second switch, a third, and a fourth switch, and a first diode and a second diode. The first switch and the second switch are coupled in series between a first power source for supplying a first voltage and a first terminal of the panel capacitor. The first switch and the second switch have a first capacitor and a second capacitor formed between both terminals thereof, respectively. The third switch and the fourth switch are coupled in series between the first terminal of the panel capacitor and a second power source for supplying a second voltage. The second voltage is a voltage lower than the first voltage. The third switch and the fourth switch have a third capacitor and a fourth capacitor formed between both terminals thereof, respectively. The first diode is coupled in a backward direction between a contact of the first and second switches and a third power source for supplying a third voltage. The third voltage is a voltage between the first voltage and the second voltage. The second diode is coupled in a forward direction between a contact of the third switch and the fourth switch and the third power source. The first voltage and the second voltage are alternately applied to the first terminal of the panel capacitor when the first and second switches and the third switch and the fourth switch are alternately turned on. The first capacitor has a lower capacitance than the second capacitor, and the third capacitor has a higher capacitance than the fourth capacitor.

In another aspect of the present invention, there is provided an apparatus for driving a plasma display panel that includes a first switch and a second switch coupled in series between a first power source for supplying a first voltage and a first terminal of the panel capacitor. The first switch and the second switch have a first and a second capacitor formed between both terminals thereof, respectively. The first voltage and a second voltage are alternately applied to the first terminal of the panel capacitor. A first electric path is formed between the first switch and the second switch and a third voltage while the first and second switches are turned off to apply the second voltage to the first terminal of the panel capacitor. The third voltage is a voltage between the first voltage and the second voltage. The first capacitor has a lower capacitance than the second capacitor.

In another aspect of the present invention, there is provided a method for driving a plasma display panel that includes turning off a first switch and a second switch coupled between a first terminal of the panel capacitor and a first power source for supplying the first voltage, and applying the second voltage to the first terminal of the panel capacitor. The method further includes forming a first electric path between a contact of the first and second switches and a third voltage. The third voltage is a voltage between the first and second voltages. A first capacitor formed between both terminals of the first switch has a lower capacitance than a second capacitor formed between both terminals of the second switch.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE EXEMPLARY EMBODIMENTS

In the following detailed description, only exemplary embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

An apparatus and method for driving a PDP according to exemplary embodiments of the present invention will be described in detail with reference to the accompanying drawings.

Figure 1:
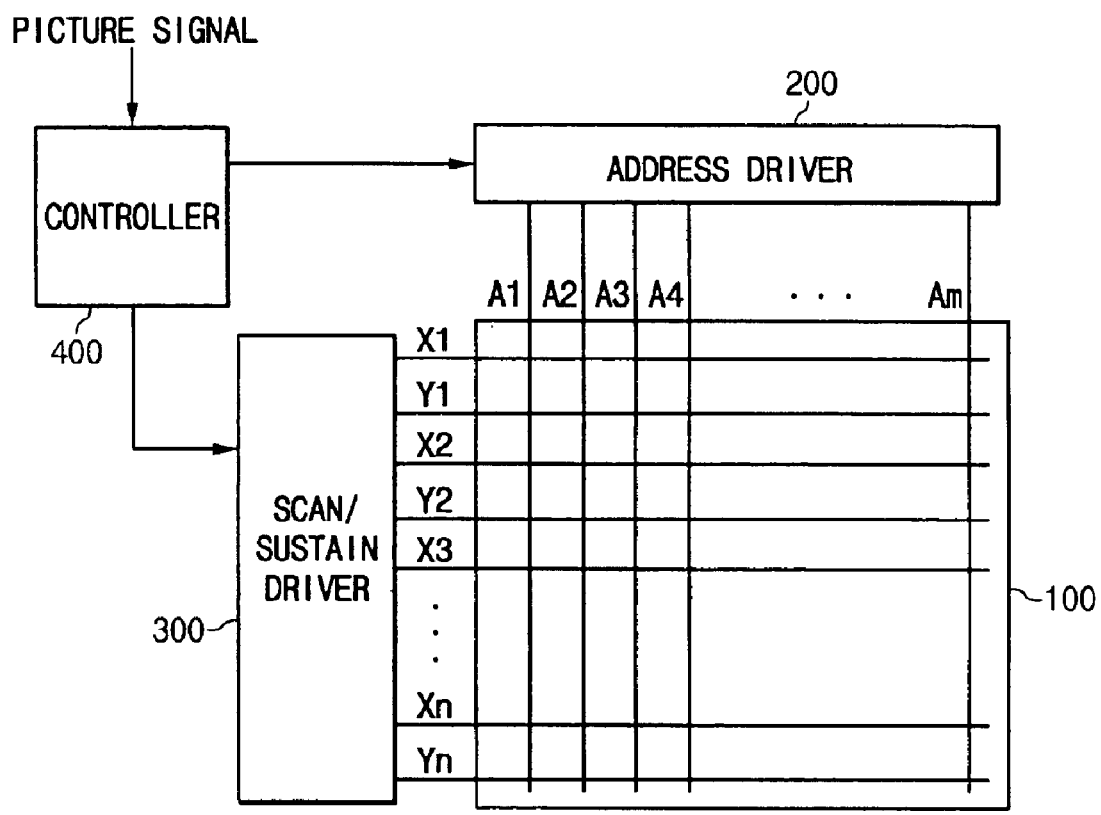
FIG. 1 is a schematic plan diagram of a PDP according to an exemplary embodiment of the present invention.

FIG. 1 is a schematic block diagram of the PDP according to an exemplary embodiment of the present invention.

A PDP comprises, for example, a plasma panel 100, an address driver 200, a scan/sustain driver 300, and a controller 400, as shown in FIG. 1.

The plasma panel 100 comprises a plurality of address electrodes $A_1$ to $A_m$ arranged in columns, and a plurality of scan electrodes $Y_1$ to $Y_n$ and sustain electrodes $X_1$ to $X_n$ which are alternately arranged in rows. The address driver 200 receives an address drive control signal from the controller 400, and a display data signal for selection of a discharge cell to be displayed applies to the individual address electrodes $A_1$ to $A_m$. The scan/sustain driver 300 receives a control signal from the controller 400, and alternately applies a sustain voltage to the scan electrodes $Y_1$, to $Y_n$ and the sustain electrodes $X_1$ to $X_n$, causing a sustain on the selected discharge cells. The controller 400 externally receives an image signal, generates the address drive control signal and the sustain signal, and applies them to the address driver 200 and the scan/sustain driver 300, respectively.

Figure 2:
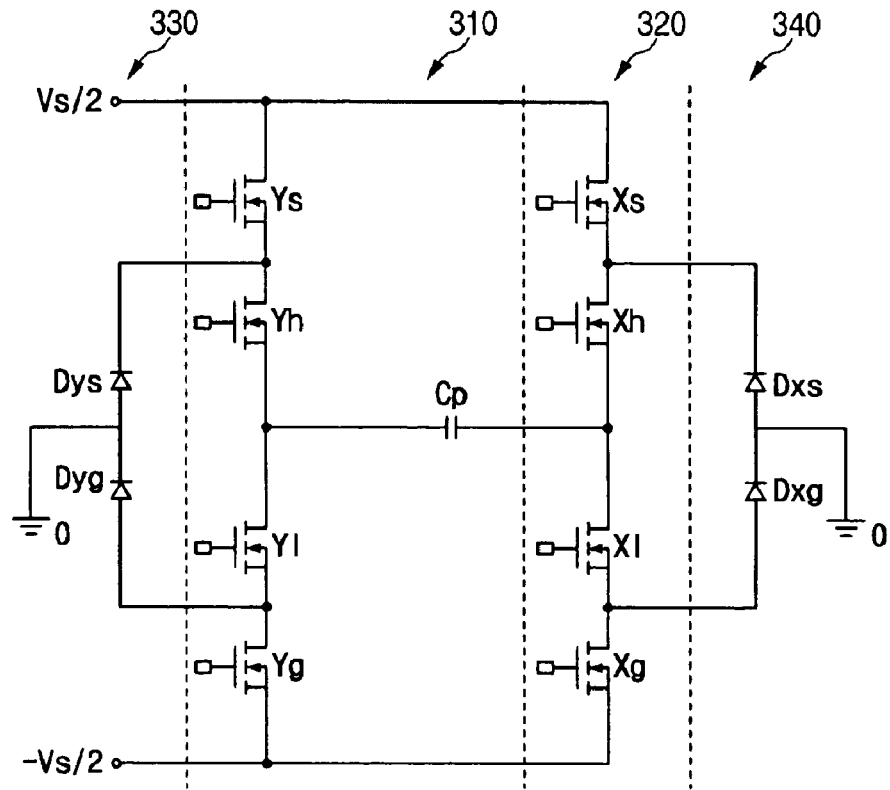
FIG. 2 is a schematic circuit diagram of a PDP driver circuit according to a first exemplary embodiment of the present invention.

FIG. 2 is a schematic circuit diagram of a PDP driver circuit according to the first exemplary embodiment of the present invention. The driver circuit according to the first embodiment of the present invention comprises, as shown in FIG. 2, a Y electrode driver 310, an X electrode driver 320, a Y electrode clamping section 330, and an X electrode clamping section 340.

The Y electrode driver 310 is coupled to X electrode driver 320, and a panel capacitor $C_p$ is coupled between the Y electrode driver 310 and the X electrode driver 320. The Y electrode driver 310 includes switches YS and Yh which are coupled in series between a power source Vs/2 and the Y electrode of the panel capacitor $C_p$, and switches $Y_l$ and $Y_g$ which are coupled in series between the Y electrode of the panel capacitor $C_p$ and a power source −Vs/2. Likewise, The X electrode driver 320 includes switches $X_s$ and $X_h$ which are coupled in series between the power source Vs/2 and the X electrode of the panel capacitor $C_p$, and switches $X_l$ and $X_g$ which are coupled in series between the X electrode of the panel capacitor $C_p$ and the power source −Vs/2.

The Y electrode clamping section 330 includes two diodes $D_{ys}$ and $D_{yg}$. The diodes $D_{ys}$ and $D_{yg}$ are coupled in series between a contact of the switches $Y_s$ and $Y_h$ and a contact of the switches $Y_l$ and $Y_g$. The contact of the diodes $D_{ys}$ and $D_{yg}$ is coupled to a ground terminal 0. Likewise, the X electrode clamping section 340 includes two diodes $D_{xs}$ and $D_{xg}$. The diodes $D_{xs}$ and $D_{xg}$ are coupled in series between a contact of the switches $X_s$ and $_h$ and a contact of the switches $X_l$ and $X_g$. The contact of the diodes $D_{xs}$ and $D_{xg}$ is coupled to the ground terminal 0.

Figure 3:
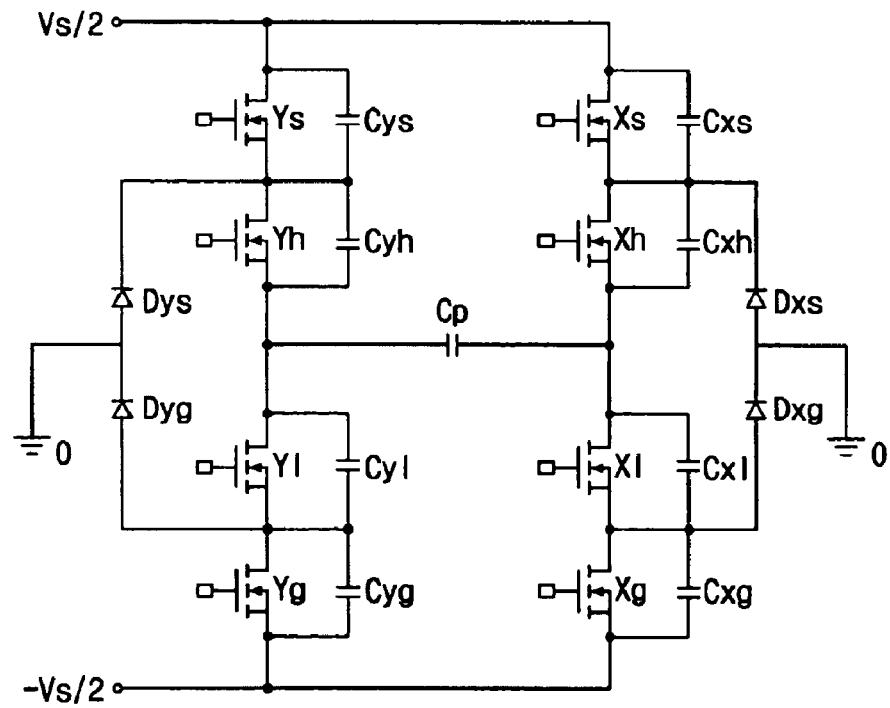
FIG. 3 is a detailed circuit diagram of the PDP driver circuit according to the first exemplary embodiment of the present invention.

FIG. 3 is a detailed circuit diagram of the PDP driver circuit according to the first embodiment of the present invention. As illustrated in FIG. 3, parasitic capacitors $C_{ys}$, $C_{yh}$, $C_{yl}$, $C_{yg}$, $C_{xs}$, $C_{xh}$, $C_{xl}$ and $C_{xg}$ are formed between both terminals of each of the switches $Y_s$, $Y_h$, $Y_l$, $Y_g$, $X_s$, $X_h$, $X_l$, and $X_g$, respectively. The parasitic capacitors $C_{ys}$, $C_{yh}$, $C_{yl}$, $C_{yg}$, $C_{xs}$, $C_{xh}$, $C_{xl}$ and $C_{xg}$ are enabled as capacitors when the switches $Y_s$, $Y_h$, $Y_l$, $Y_g$, $X_s$, $X_h$, $X_l$, and $X_g$ are turned off, respectively. The capacitance of each parasitic capacitor satisfies Equation 1. Expediently, the capacitances of the parasitic capacitors $C_{ys}$, $C_{yh}$, $C_{yl}$, $C_{yg}$, $C_{xs}$, $C_{xh}$, $C_{xl}$, and $C_{xg}$ are denoted by the same symbol.

$$C_{ys} \leq C_{yh}$$
$$C_{yg} \leq C_{yl}$$
$$C_{xs} \leq C_{xh}$$
$$C_{xg} \leq C_{xl} \quad \text{[Equation 1]}$$

The parasitic capacitors are used in the embodiment of the present invention, but separate capacitors can also be used instead of the parasitic capacitors. The switches $Y_s$, $Y_h$, $Y_l$, $Y_g$, $X_s$, $X_h$, $X_l$, and $X_g$ included in the Y and X electrode clamping sections 330 and 340 are denoted as MOSFETs in FIGS. 2 and 3, however, it would be understood by one of ordinary skill in the art that any known switches can be used so long as they have the same or similar functions. Each of these switches may have a body diode.

Figure 4:
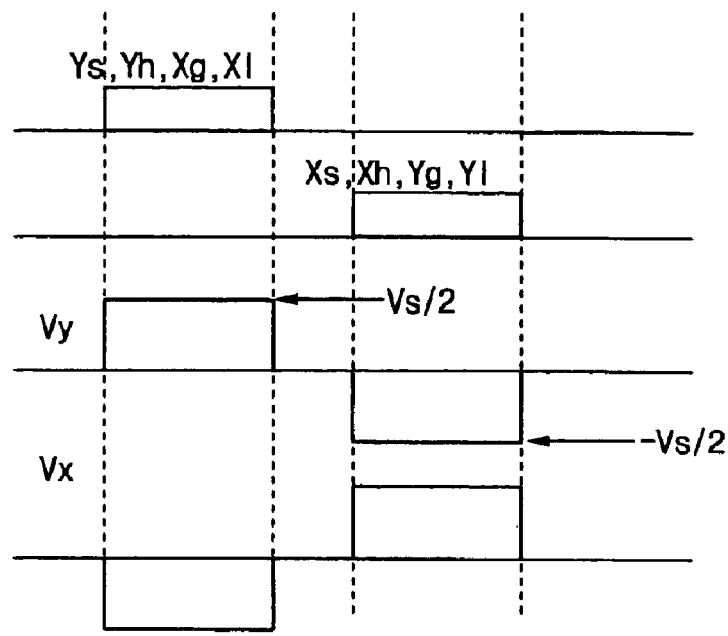
FIG. 4 is a timing diagram of the driver circuit according to the first exemplary embodiment of the present invention.
Figure 5A:
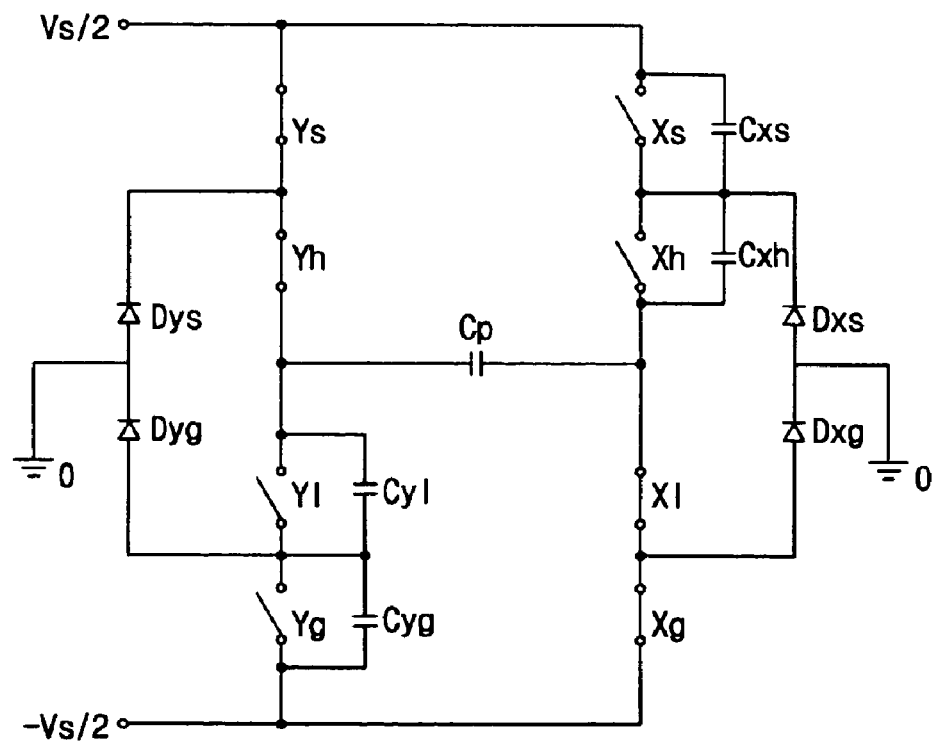
FIGS. 5A and 5B are schematic circuit diagrams showing the current paths of the respective modes in the driver circuit according to the first exemplary embodiment of the present invention.
Figure 5B:
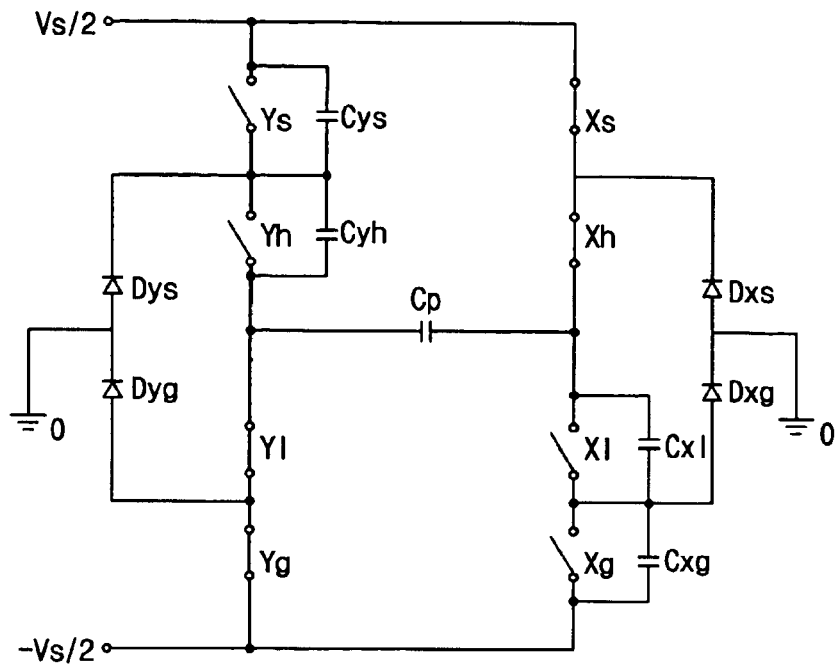

Next, the driving method of the driver circuit according to the first exemplary embodiment of the present invention will be described with reference to FIGS. 4, 5A, and 5B. FIG. 4 is a timing diagram of the driver circuit according to the first embodiment of the present invention. FIGS. 5A and 5B are schematic circuit diagrams showing the current paths of the respective modes in the driver circuit according to the first embodiment of the present invention.

The upper portion of FIG. 4 shows the on/off status of the switches $Y_s$, $Y_h$, $Y_l$, $Y_g$, $X_s$, $X_h$, $X_l$, and $X_g$, i.e., "ON" state in the upper side and "OFF" state in the lower side. The bottom portion of FIG. 4 shows the X electrode voltage $V_x$ and the Y electrode voltage $V_y$ of the panel capacitor $C_p$.

It is assumed in the first embodiment of the present invention that the voltages supplied by the power sources Vs/2 and −Vs/2 are $V_s/2$ and $−V_s/2$, respectively. The voltage $V_s/2$ corresponds to a half of the sustain voltage $V_s$ necessary for the sustain of the panel.

During mode 1 M1, as illustrated in FIG. 4, the switches $Y_s$, $Y_h$, $X_g$, and $X_l$ are turned ON, while the switches $X_s$, $X_h$, $Y_g$, and $Y_l$ are in the "OFF" state.

As illustrated in FIG. 5a, the voltage $V_s/2$ is applied to the Y electrode of the panel capacitor $C_p$ by the switches $Y_s$ and $Y_h$ while they are in the on state, and the voltage $−V_s/2$ is applied to the X electrode of the panel capacitor $C_p$ by the switches $X_l$ and $X_g$ while they are in the on state. Accordingly, the Y electrode voltage $V_y$ and the X electrode voltage $V_x$ of the panel capacitor $C_p$ become $V_s/2$ and $−V_s/2$, respectively, so the sustain voltage $V_s$ is applied to both terminals of the panel capacitor $C_p$.

Without diodes $D_{ys}$, $D_{yg}$, $D_{xs}$, and $D_{xg}$, the voltages $V_{yl}$, $V_{yg}$, $V_{xs}$, and $V_{xh}$ at both terminals of the respective switches $Y_l$, $Y_g$, $X_s$, and $X_h$ are given by Equations 2 and 3 according to the parasitic capacitors $C_{yl}$, $C_{yg}$, $C_{xs}$, and $C_{xh}$.

$$V_{yl} = \frac{C_{yg}}{C_{yl} + C_{yg}} V_S \quad \text{[Equation 2]}$$

$$V_{yg} = \frac{C_{yl}}{C_{yl} + C_{yg}} V_S$$

$$V_{xs} = \frac{C_{xh}}{C_{xs} + C_{xh}} V_S \quad \text{[Equation 3]}$$

$$V_{xh} = \frac{C_{xs}}{C_{xs} + C_{xh}} V_S$$

Here, the capacitance $C_{yl}$ is greater than the capacitance $C_{yg}$ as expressed by Equation 1, so the voltage $V_{yl}$ is lower than $V_s/2$ and the voltage $V_{yg}$ is higher than $V_s/2$. With the diode $D_{yg}$ coupled to the contact of the switches $Y_l$ and $Y_g$ as in this embodiment of the present invention, the diode $D_{yg}$ is turned on due to the voltage difference. Hence, both the terminal voltages $V_{yl}$ and $V_{yg}$ of the switches $Y_l$ and $Y_g$ are clamped to $V_s/2$ through the diode $D_{yg}$. Likewise, because the capacitance $C_{xs}$ is less than the capacitance $C_{xh}$, the voltage $V_{xs}$ is higher than $V_s/2$ and the voltage $V_{xh}$ is lower than $V_s/2$ and the diode $D_{xs}$ which is coupled to the contact of the switches $X_s$ and $X_h$ is turned on. Hence, both the terminal voltages $V_{xs}$ and $V_{xh}$ of the switches $X_s$ and $X_h$ are clamped to $−V_s/2$ through the diode $D_{xs}$.

During mode 2 M2, as illustrated in FIG. 4, the switches $Y_s$, $Y_h$, $X_g$, and $X_l$ are turned OFF and the switches $X_s$, $X_h$, $Y_g$, and $Y_l$ are turned ON.

As illustrated in FIG. 5b, the voltage $−V_s/2$ is applied to the Y electrode of the panel capacitor $C_p$ by the switches $Y_g$ and $Y_l$ which are in the on state, and the voltage $V_s/2$ is applied to the X electrode of the panel capacitor $C_p$ by the switches $X_s$ and $X_h$ which are in the on state. Accordingly, the Y electrode voltage $V_y$ and the X electrode voltages $V_x$ of the panel capacitor $C_p$ become $−V_s/2$ and $V_s/2$, respectively, so the sustain voltage $V_s$ is applied to both terminals of the panel capacitor $C_p$.

Without diodes $D_{ys}$, $D_{yg}$, $D_{xs}$, and $C_{xg}$, the voltages $V_{ys}$, $V_{yh}$, $V_{xl}$, and $V_{xg}$ at both terminals of the respective switches $Y_s$, $Y_h$, $X_l$, and $X_g$ are given by Equations 4 and 5 according to the parasitic capacitors $C_{ys}$, $C_{yh}$, $C_{xl}$, and $C_{xg}$.

$$V_{ys} = \frac{C_{yh}}{C_{ys} + C_{yh}} V_S \quad \text{[Equation 4]}$$

$$V_{hg} = \frac{C_{ys}}{C_{ys} + C_{yh}} V_S$$

$$V_{xl} = \frac{C_{xg}}{C_{xl} + C_{xg}} V_S \quad \text{[Equation 5]}$$

$$V_{xg} = \frac{C_{xl}}{C_{xl} + C_{xg}} V_S$$

Here, the capacitance $C_{ys}$ is less than the capacitance $C_{yh}$ and the capacitance $C_{xl}$ is greater than the capacitance $C_{xg}$ as expressed by Equation 1, so the voltages $V_{ys}$ and $V_{xg}$ are higher than $V_s/2$ and the voltages $V_{yh}$ and $V_{xl}$ are lower than $V_s/2$. As described above with regard to mode 1 M1, the diodes $D_{ys}$ and $D_{xg}$ are turned on, when they are coupled to the contact of the switches $Y_s$ and $Y_h$ and the contact of the switches $X_l$ and $X_g$, respectively. Hence, the terminal voltages $V_{ys}$ and $V_{yh}$ of the switches $Y_s$ and $Y_h$ are clamped to $−V_s/2$ through the diode $D_{ys}$, and the terminal voltages $V_{xl}$ and $V_{xg}$ of the switches $X_l$ and $X_g$ are clamped to $V_s/2$ through the diode $D_{xg}$.

According to the first embodiment of the present invention, the terminal voltages of the switches $Y_l$, $Y_h$, $X_l$, and $X_g$ and the switches $Y_l$, $Y_g$, $X_s$, and $X_h$ can be clamped to $V_s/2$ and $V_s/2$, as necessary through the diodes $D_{ys}$, $D_{yg}$, $D_{xs}$, and $D_{xg}$ while the sustain voltage $V_s$ is applied to both terminals of the panel capacitor $C_p$. Thus, switches having a low withstand voltage can be used as the switches $Y_s$, $Y_h$, $Y_l$, $Y_g$, $X_s$, $X_h$, $X_l$, and $X_g$. In addition, there is no need for using a capacitor for applying a negative (−) voltage $−V_s/2$ to the Y or X electrode of the panel capacitor $C_p$, so that a high inrush current possibly caused in the prior art hardly occurs.

To apply a waveform for the sustain to the panel capacitor $C_p$, a reactive power is necessary as well as the power for a discharge because of the capacitance component of the panel capacitor $C_p$. Next, a detailed description will be given as to an exemplary embodiment having a power recovery circuit in addition to the driver circuit according to the first exemplary embodiment of the present invention with reference to FIGS. 6, 7, and 8A to 8H.

Figure 6:
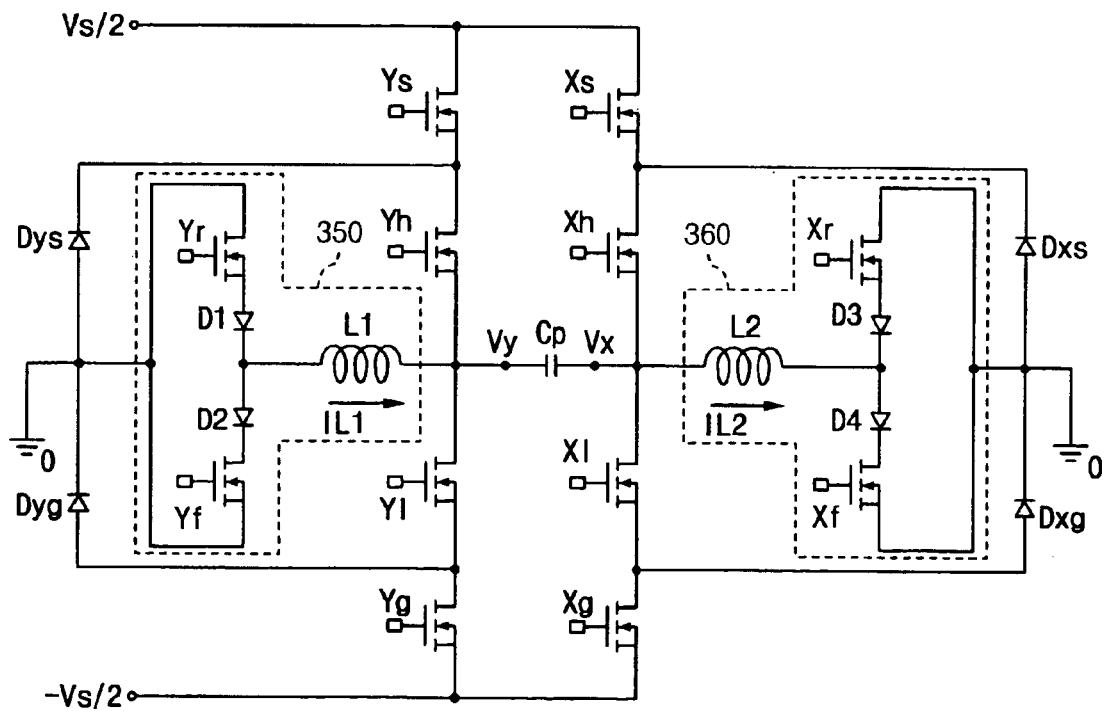
FIG. 6 is a schematic circuit diagram of a PDP driver circuit according to a second exemplary embodiment of the present invention.

FIG. 6 is a schematic circuit diagram of a PDP driver circuit according to a second exemplary embodiment of the present invention; FIG. 8 is a timing diagram of the driver circuit according to the second exemplary embodiment of the present invention; and FIGS. 8A to 8H are schematic circuit diagrams showing the current paths of the respective modes in the driver circuit according to the second embodiment of the present invention.

The driver circuit according to the second exemplary embodiment of the present invention comprises, as shown in FIG. 6, Y and X power recovery sections 350 and 360 in addition to the driver circuit according to the first embodiment of the present invention.

The Y electrode power recovery section 350 includes an inductor $L_1$ and switches $Y_r$ and $Y_f$. The one terminal of the inductor $L_1$ is coupled to the contact of the switches $Y_h$ and $Y_l$ of the Y electrode driver 310, i.e., the Y electrode of the panel capacitor $C_p$. The switches $Y_r$ and $Y_f$ are coupled in parallel between the other terminal of the inductor $L_1$ and the ground terminal 0. The Y electrode power recovery section 350 may further include diodes $D_1$ and $D_2$ coupled between the switches $Y_r$ and $Y_f$ and the inductor $L_1$, respectively. The diodes $D_1$ and $D_2$ serve to interrupt a current path possibly formed by the body diodes of the switches $Y_r$ and $Y_f$.

The X electrode power recovery section 360 includes an inductor $L_2$ and switches $X_r$ and $X_f$, and additionally diodes $D_3$ and $D_4$. The structure of the X electrode power recovery section 360 is the same as that of the Y electrode power recovery section 350. The switches $Y_r$, $Y_f$, $X_r$, and $X_f$ of the Y and X electrode power recovery sections 350 and 360 can be comprised, for example, of MOSFETs having a body diode.

Figure 7:
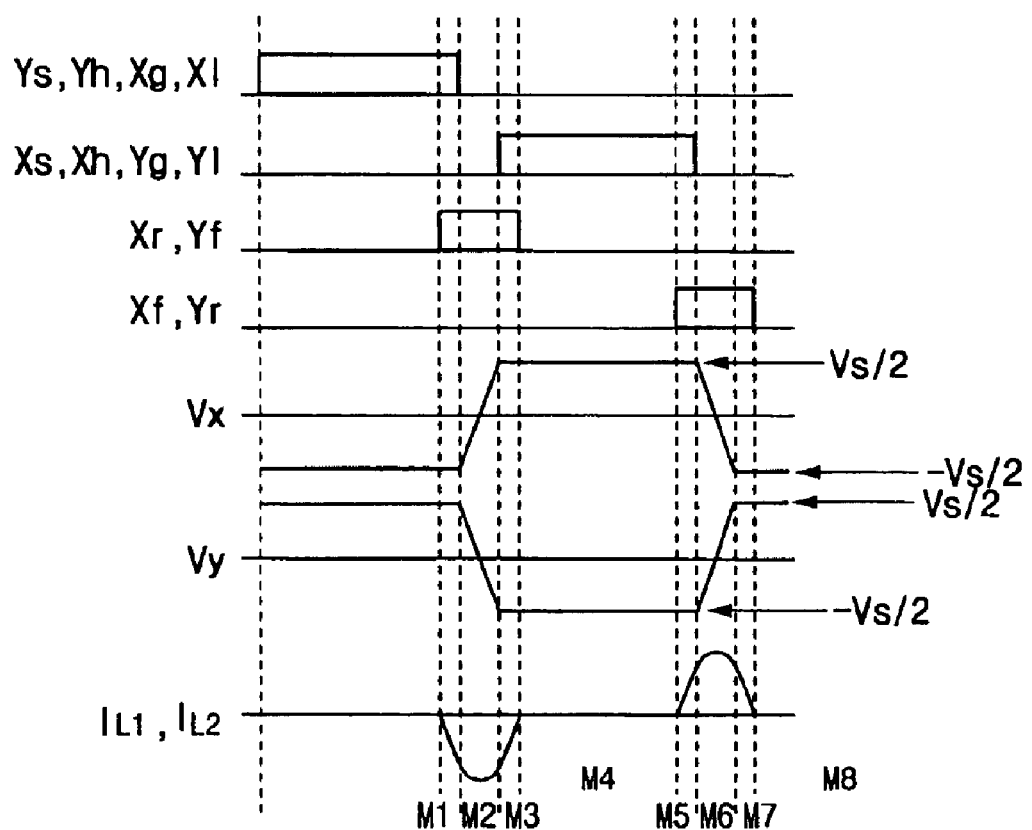
FIG. 7 is a timing diagram of the driver circuit according to the second exemplary embodiment of the present invention.

Next, the sequential operation of the driver circuit according to the second embodiment of the present invention will be described with reference to FIGS. 7 and 8A to 8H. Here, the operation proceeds through eight modes M1 to M8, which are changed by the manipulation of switches. The phenomenon called "LC resonance" herein is not a continuous oscillation but a transient voltage or current variation caused by the combination of the inductors and the panel capacitor $C_p$ when the switches $X_r$, $Y_f$, $X_f$, and $Y_r$ are turned on. The upper portion of FIG. 7 shows the on/off status of the switches $X_s$, $X_h$, $X_g$, $X_l$, $X_r$, $X_f$, $Y_s$, $Y_h$, $Y_g$, $Y_l$, $Y_f$, $Y_r$, and $X_f$, i.e., "ON" state in the upper side and "OFF" state in the lower side. The bottom portion of FIG. 7 shows X and Y electrode voltages $V_x$ and $V_y$ of the panel capacitor $C_p$, and currents $I_{L1}$ and $I_{L2}$ of the inductors $L_1$ and $L_2$.

It is assumed in the second exemplary embodiment of the present invention that the switches $Y_s$, $Y_h$, $X_g$, and $X_l$ are in the "ON" state before the start of the mode 1 M1, so the Y and X electrode voltages $V_y$ and $V_x$ of the panel capacitor $C_p$ are sustained at $V_s/2$ and $-V_s/2$, respectively. The inductances of the inductors $L_1$ and $L_2$ are both denoted by L.

Figure 8A:
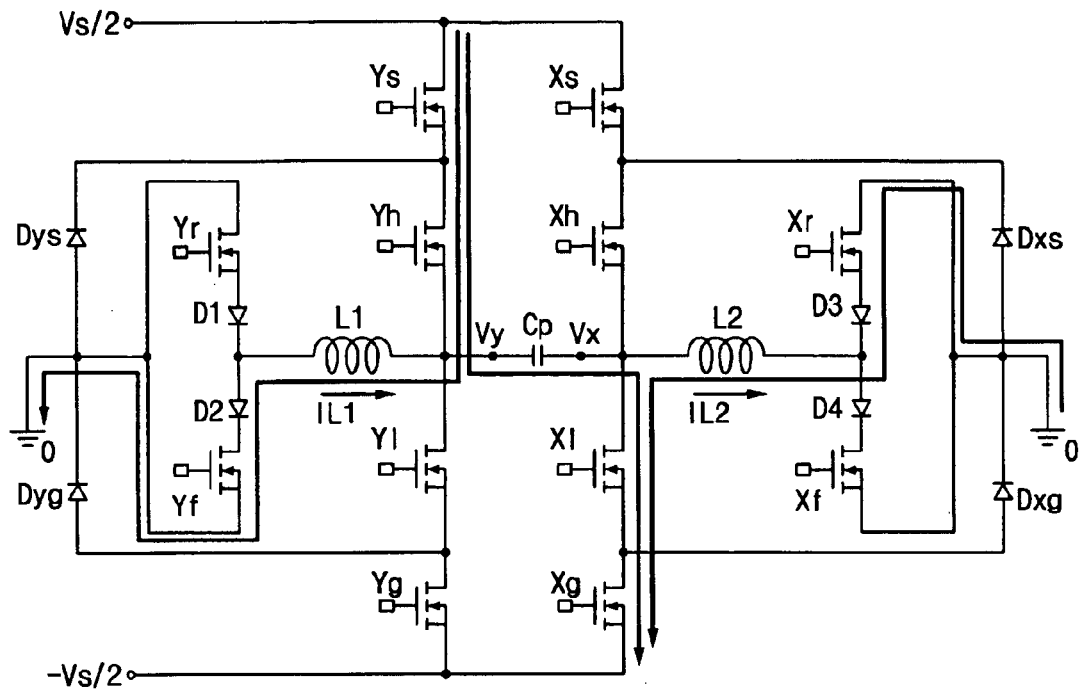
FIGS. 8A, 8B, 8C, 8D, 8E, 8F, 8G and 8H are schematic circuit diagrams showing the current paths of the respective modes in the driver circuit according to the second exemplary embodiment of the present invention.

During mode 1 M1, as illustrated in FIGS. 7 and 8A, the Y and X electrode voltages $V_y$ and $V_x$ of the panel capacitor $C_p$ are sustained at $V_s/2$ and $-V_s/2$ by the switches $Y_s$ and $Y_h$ and the switches $X_l$ and $X_g$ in the "ON" state, respectively. In the same manner as described in the mode 1 M1 of the first embodiment, the terminal voltages $V_{yl}$, $V_{yg}$, $V_{xs}$, and $V_{xh}$ of the switches $Y_l$, $Y_g$, $X_s$, and $X_h$ are all clamped to $V_s/2$ through the diodes $D_{yg}$ and $D_{xs}$, respectively. With the switches $Y_f$ and $X_r$ in the "ON" state, there are formed a current path including the power source Vs/2, the switches $Y_s$ and $Y_h$, the inductor $L_1$, the diode $D_2$, the switch $Y_f$, and the ground terminal 0 in sequence, and a current path including the ground terminal 0, the switch $X_r$, the diode $D_3$, the inductor $L_2$, the switches $X_l$ and $X_g$, and the power source $-V_s/2$ in sequence. The two current paths cause a current to be injected to the inductors $L_1$ and $L_2$, so the currents $I_{L1}$ and $I_{L2}$ flowing to the inductors $L_1$ and $L_2$ are both linearly increased with a slope of $V_s/2L$ with an elapse of time.

Figure 8B:
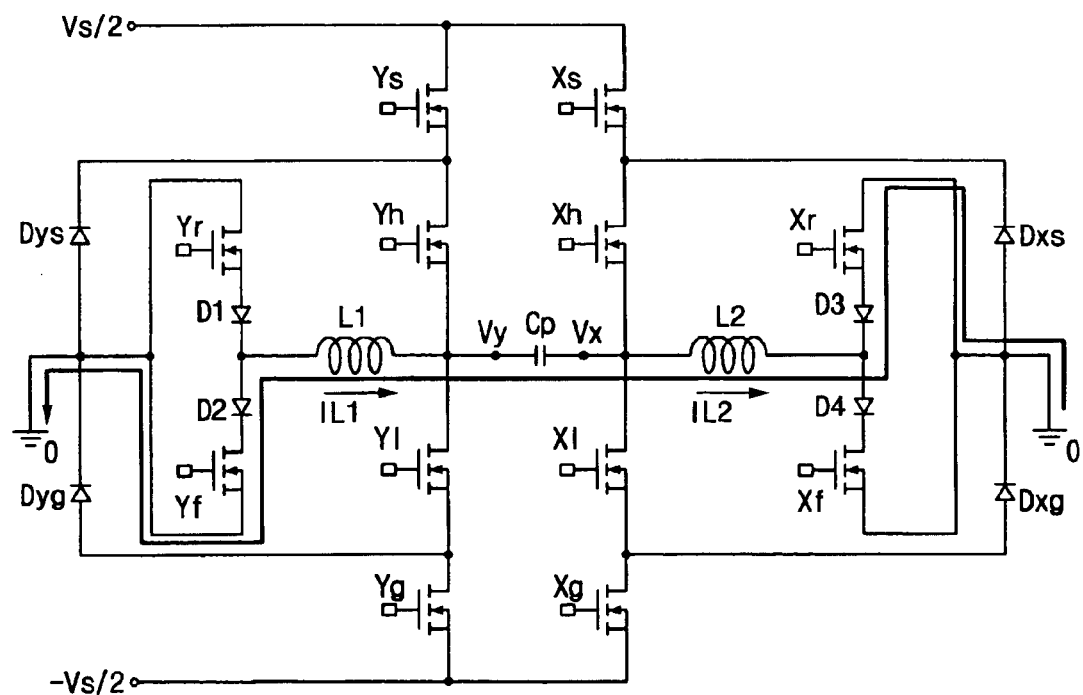

During mode 2 M2, as illustrated in FIGS. 7 and 8B, the switches $Y_s$, $Y_h$, $X_g$, and $X_l$ are turned OFF to form a current path that includes the switch $X_r$, the diode $D_3$, the inductor $L_2$, the panel capacitor $C_p$, the inductor $L_1$, the diode $D_2$, and the switch $Y_f$ in sequence, causing a resonant current by the inductors $L_1$ and $L_2$, and the panel capacitor $C_p$. Due to the resonant current, the Y electrode voltage $V_y$ of the panel capacitor $C_p$ falls and the X electrode voltage $V_x$ rises. These voltages $V_y$ and $V_x$ do not exceed $-V_s/2$ and $V_s/2$ due to the body diodes of the switches $Y_l$ and $Y_g$, respectively.

In this manner of mode 2 M2, the resonance occurs while currents flow to the inductors $L_1$ and $L_2$, thereby changing the Y and X electrode voltages $V_y$ and $V_x$ to $-V_s/2$ and $V_s/2$, respectively, and increasing the conversion rate even with a parasitic component in the circuit.

Figure 8C:
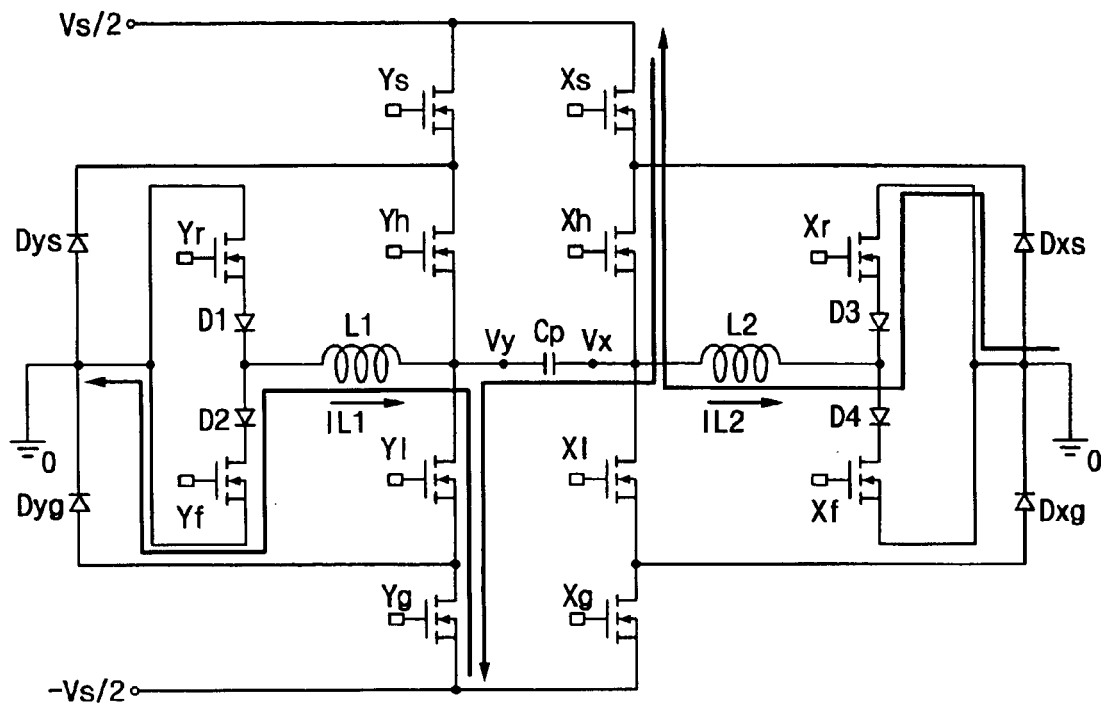

During mode 3 M3, the switches $X_s$, $X_h$, $Y_g$, and $Y_l$ are turned ON, so the Y and X electrode voltages $V_y$ and $V_x$ of the panel capacitor $C_p$ are sustained at $-V_s/2$ and $V_s/2$, respectively, as illustrated in FIG. 8C. The current $I_{L1}$ flowing to the inductor $L_1$ is recovered to the ground terminal 0 through a current path including the body diodes of the switches $Y_g$ and $Y_l$, the inductor $L_1$, the diode $D_2$, and the switch $Y_f$ in sequence. The current $I_{L2}$ flowing to the inductor $L_2$ is recovered to the power source $V_s/2$ through a current path including the switch $X_r$, the diode $D_3$, the inductor $L_2$, and the body diodes of the switches $X_h$ and $X_s$ in sequence.

Figure 8D:
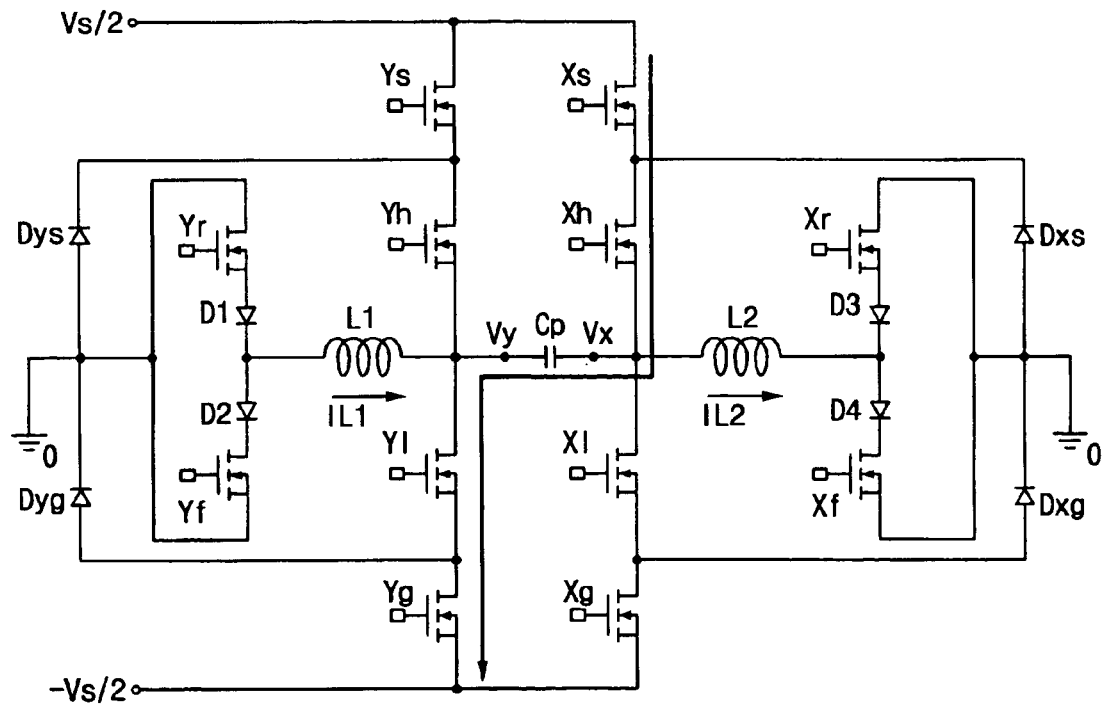

During mode 4 M4, the switches $Y_f$ and $X_r$ are turned OFF when the currents $I_{L1}$ and $I_{L2}$ flowing to the inductors $L_1$ and $L_2$ approach 0 A. With the switches $Y_l$, $Y_g$, $X_s$, and $X_h$ in the "ON" state, as illustrated in FIG. 8D, the Y and X electrode voltages $V_y$ and $V_x$ of the panel capacitor $C_p$ are sustained at $-V_s/2$ and $V_s/2$, respectively.

Figure 8E:
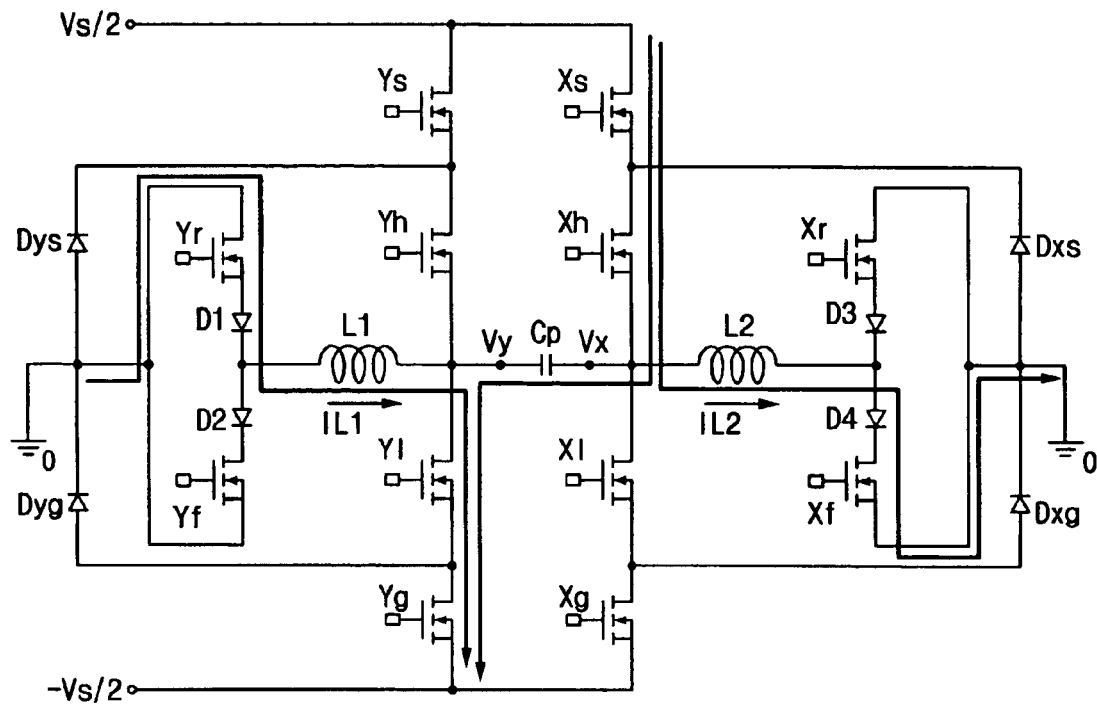
Figure 8F:
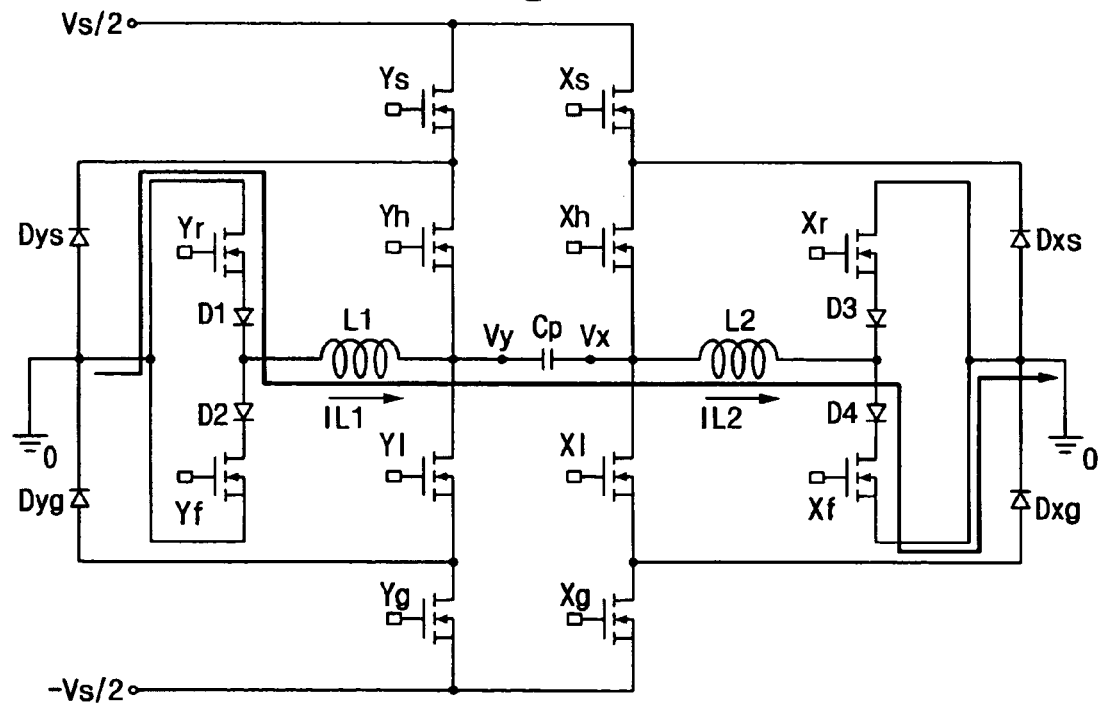

During mode 5 M5, currents are injected to the inductors $L_1$ and $L_2$ while the Y and X electrode voltages $V_y$ and $V_x$ of the panel capacitor $C_p$ are sustained at $-V_s/2$ and $V_s/2$, respectively. More specifically, as illustrated in FIG. 8E, the switches $Y_r$ and $X_f$ are turned ON to form a current path including the ground terminal 0, the switch $Y_r$, the diode $D_1$, the inductor $L_1$, the switches $Y_l$ and $Y_g$, and the power source $-V_s/2$ in sequence, and a current path including the power source Vs/2, the switches $X_s$ and $X_h$, the inductor $L_2$, the diode $D_4$, the switch $X_f$, and the ground terminal 0 in sequence. Due to the two current paths, the currents $I_{L1}$ and $I_{L2}$ flowing to the inductors $L_1$ and $L_2$ are both linearly increased with a slope of $V_s/2L$ with an elapse of time.

During modes 3, 4, and 5 M3, M4, and M5, the switches $Y_s$, $Y_h$, $X_l$, and $X_g$ are in the "OFF" state while the Y and X electrode voltages $V_y$ and $V_x$ of the panel capacitor $C_p$ are sustained at $-V_s/2$ and $V_s/2$, respectively. So, the terminal voltages $V_{ys}$, $V_{yh}$, $V_{xl}$, and $V_{xg}$ of the switches $Y_s$, $Y_h$, $X_l$, and $X_g$ are all clamped to $V_s/2$ through the diodes $D_{ys}$ and $D_{xg}$, respectively, as described in mode 2 of the first embodiment.

After injection of the current to the inductors $L_1$ and $L_2$, the switches $X_s$, $X_h$, $Y_l$, and $Y_g$ are turned OFF in the mode 6 M6. Then, a resonance occurs between the inductors $L_1$ and $L_2$ and the panel capacitor $C_p$ through the current path shown in FIG. 8F. Due to the resonant current, the Y electrode voltage $V_y$ of the panel capacitor $C_p$ rises and the X electrode voltage $V_x$ falls. These voltages $V_y$ and $V_x$ do not exceed $V_s/2$ and $-V_s/2$ due to the body diodes of the switches $X_l$ and $X_g$, respectively. As in the mode 2 M2, the resonance occurs while the currents flow to the inductors $L_1$ and $L_2$.

Figure 8G:
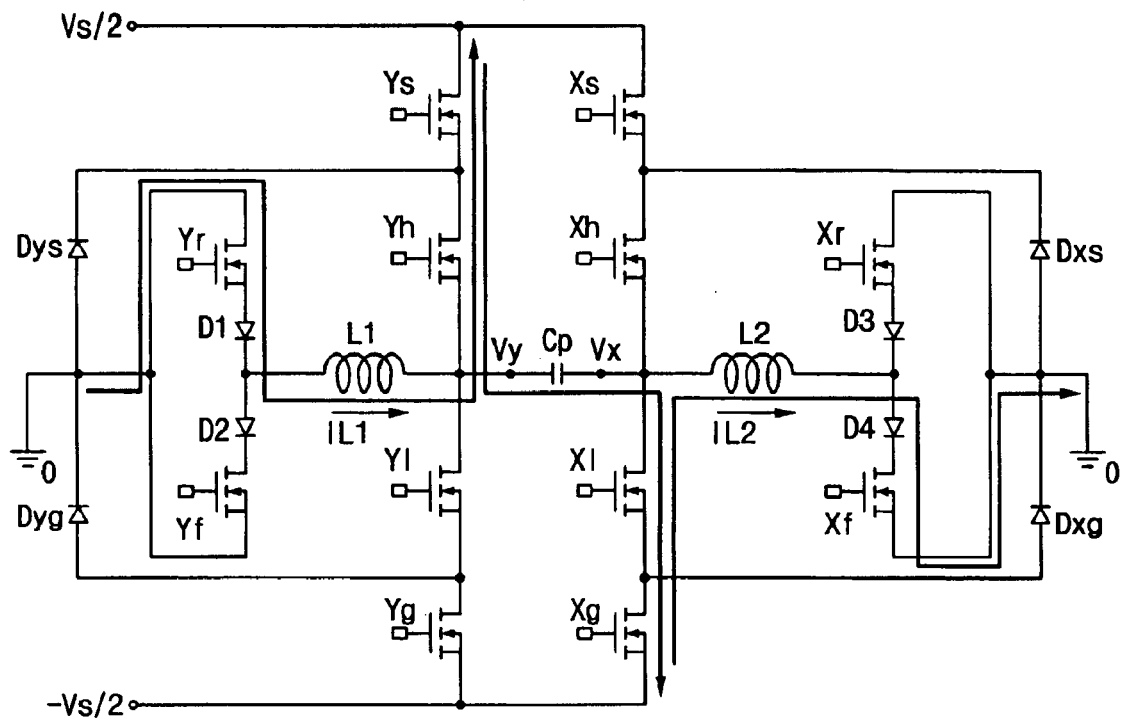
Figure 8H:
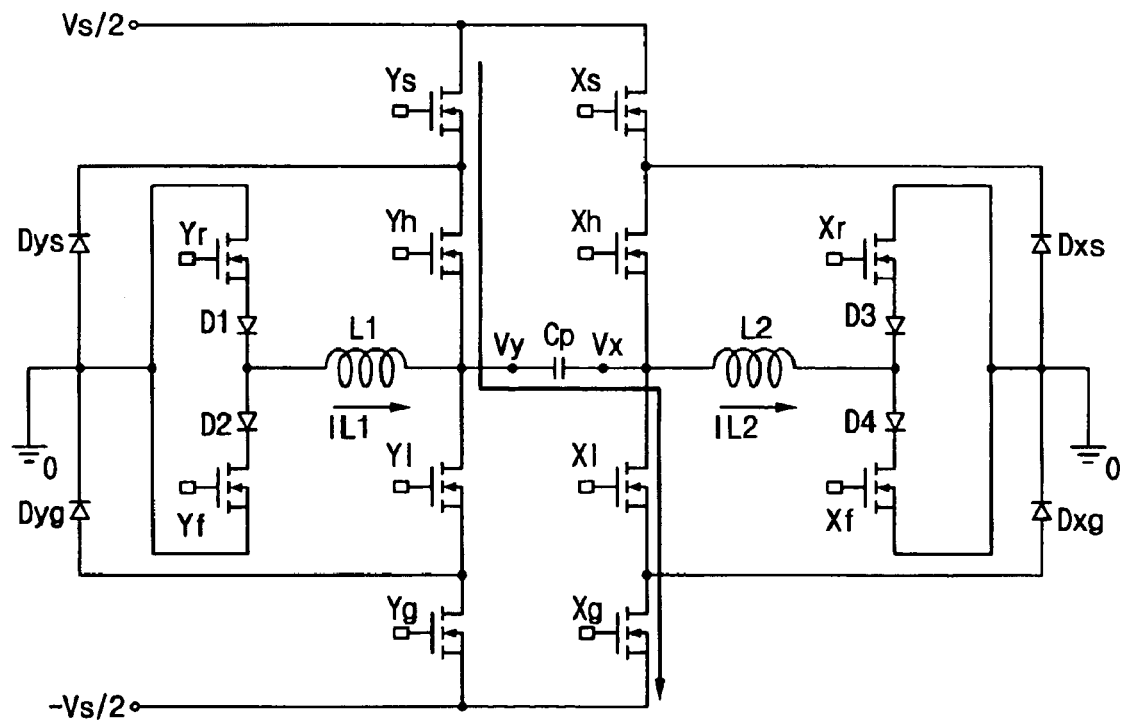

During mode 7 M7, the switches $Y_s$, $Y_h$, $X_l$, and $X_g$ are turned ON, so the Y and X electrode voltages $V_y$ and $V_x$ of the panel capacitor $C_p$ are sustained at $V_s/2$ and $-V_s/2$, respectively, through the current path of FIG. 8G. The current $I_{L1}$ flowing to the inductor $L_1$ is recovered to the power source Vs/2 through a current including the switch $Y_r$, the diode $D_1$, the inductor $L_1$, and the body diodes of the switches $Y_h$ and $Y_s$, in sequence. The current $I_{L2}$ flowing to the inductor $L_2$ is recovered to the ground terminal 0 through a current path including the body diodes of the switches $X_g$ and $X_l$, the inductor $L_2$, the diode $D_4$, and the switch $X_f$ in sequence.

During mode 8 M8, the switches $Y_r$ and $X_f$ are turned OFF when the currents $I_{L1}$ and $I_{L2}$ flowing to the inductors $L_1$ and $L_2$ approach 0 A. With the switches $Y_s$, $Y_h$, $X_l$, and $X_g$ in the "ON" state, as illustrated in FIG. 8E, the Y and X electrode voltages $V_y$ and $V_x$ of the panel capacitor $C_p$ are sustained at $V_s/2$ and $-V/2$, respectively. During modes 7 and 8 M7 and M8, the terminal voltages $V_{yl}$, $V_{yg}$, $V_{xs}$, and $V_{xh}$ of the switches $Y_l$, $Y_g$, $X_s$, and $X_h$ are all clamped to $V_s/2$ through the diodes $D_{yg}$ and $D_{xs}$, respectively, in the same manner as described in the mode 1 M1.

Subsequently, the cycle of modes 1 to 8 repeats to generate the Y and X electrode voltages $V_y$ and $V_x$ swinging between $V_s/2$ and $-V_s/2$, so the potential difference between the X and Y electrodes can be the sustain voltage $V_s$.

In the second embodiment of the present invention, the resonance is caused after the injection of current to the inductors $L_1$ and $L_2$ through the steps of the modes 1 and 5 M1 and M5. But, the resonance can occur without the steps of the modes 1 and 5 M1 and M5. In addition, another type of power recovery circuit can be used instead of the above-stated power recovery circuit.

In the first and second exemplary embodiments of the present invention, the voltages supplied from the power sources Vs/2 and $-$Vs/2 are $V_s/2$ and $-V_s/2$, respectively. But, any other voltages can be used so long as the voltage difference between them is equal to the voltage $V_s$ necessary for the sustain. Generally, the voltages supplied from the two power sources can be $V_h$ and $V_h-V_s$, and the voltage from the ground terminal can be $(2V_h-V_s)/2$, so that the Y and X electrode voltages $V_y$ and $V_x$ swing between $V_h$ and $V_h-V_s$.

Next, a description will be given as to another embodiment with reference to FIG. 9, in which the ground terminal 0 and power sources Vs each supplying a voltage of $V_s$ are used instead of the power source of the first embodiment.

Figure 9:
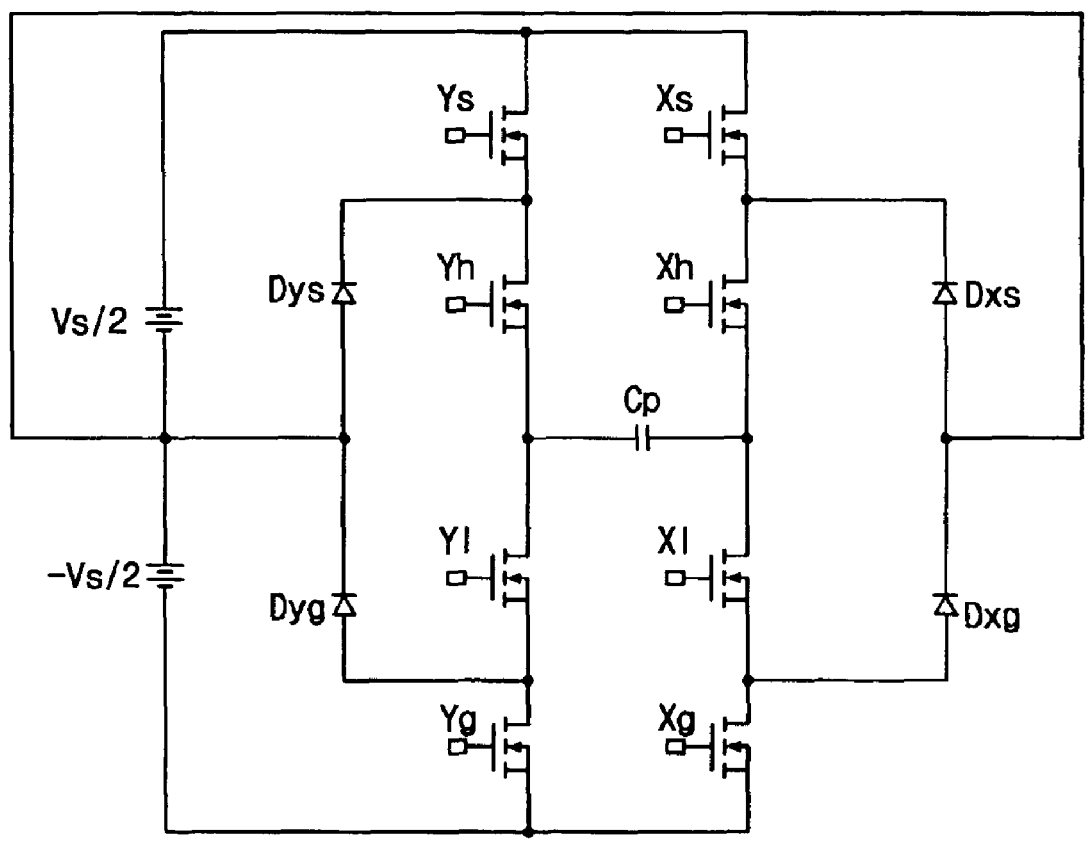
FIG. 9 is a schematic circuit diagram of a PDP driver circuit according to a third exemplary embodiment of the present invention.

FIG. 9 is a schematic circuit diagram of a PDP driver circuit according to a third exemplary embodiment of the present invention.

The driver circuit according to the third exemplary embodiment of the present invention uses two power sources each supplying a voltage of $V_s/2$, as illustrated in FIG. 9. More specifically, the switches $Y_s$ and $X_s$ of the Y and X electrode drivers 310 and 320 are coupled to the two serial power sources, and the switches $Y_g$ and $X_g$ are coupled to the ground terminal 0. The contact of diodes $D_{yl}$ and $D_{yg}$ and the contact of diodes $D_{xs}$ and $X_{xg}$ of the Y and X electrode clamping sections 330 and 340 are coupled to the contact of the two power sources.

The operation of the driver circuit according to the third exemplary embodiment of the present invention is the same as that of the driver circuit according to the first embodiment, except for the voltages applied to the Y and X electrode voltages $V_y$ and $V_x$ of the panel capacitor $C_p$.

More specifically, during mode 1, $V_s$ and 0V are applied to the Y and X electrodes of the panel capacitor $C_p$, respectively. Also, the diode $D_{yg}$ is turned on to apply a voltage of $V_s/2$ to both terminals of the switches $Y_l$ and $Y_g$, as described in the first exemplary embodiment. Likewise, the terminal voltages $V_{xs}$ and $V_{xh}$ of the switches $X_s$ and $X_h$ are both clamped to $V_s/2$ due to the diode $D_{xs}$. In the mode 2, 0V and $V_s$ are applied to the Y and X electrodes of the panel capacitor $C_p$, respectively. Due to the diodes $D_{ys}$ and $D_{xg}$, a voltage of $V_s/2$ is applied to both terminals of the switches $Y_s$, $Y_h$, $X_l$, and $X_g$.

In the first, second, and third exemplary embodiments of the present invention, two switches are formed between the power source and the X or Y electrode of the panel capacitor $C_p$. But, it should be understood by one of ordinary skill in the art that more than two switches can be formed between the power source and the X or Y electrode of the panel capacitor. For example, it can be assumed in the first exemplary embodiment of the present invention that, for example, four switches $S_1$, $S_2$, $S_3$, and $S_4$ are coupled in series between the power source Vs/2 and the Y electrode of the panel capacitor $C_p$, and, for example, four switches $S_5$, $S_6$, $S_7$, and $S_8$ are coupled in series between the Y electrode of the panel capacitor $C_p$ and the power source $-$Vs/2. With a capacitor $C_1$ coupled between the contact of the switches $S_2$ and $S_3$ and between the contact of the switches $S_6$ and $S_7$, a voltage of $V_s/2$ is applied to the two adjacent switches $S_1$ and $S_2$, $S_3$ and $S_4$, $S_5$ and $S_6$, or $S_7$ and $S_8$.

According to the present invention, the withstand voltage of each switch can be a half of the voltage $V_s$ necessary for the sustain, so switches of a low withstand voltage can be used to reduce the production cost. This also prevents an inrush current that possibly occurs when the terminal voltages of the panel capacitor are changed by using the voltage stored in an external capacitor. Furthermore, the driver circuit of the present invention can be adapted irrespective of the waveform of the sustain voltage pulse by changing the power source applied to the driver circuit.

While this invention has been described in connection with what is presently considered to be the most practical and exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for driving a plasma display panel, which is for applying a driving voltage to a panel capacitor formed between first and second electrodes, the apparatus comprising:

a first switch and a second switch coupled in series between the first power source for supplying a first voltage and a first terminal of the panel capacitor, the first switch and a second switch having a first capacitor and a second capacitor formed between both terminals thereof, respectively;

a third switch and a fourth switch coupled in series between the first terminal of the panel capacitor and the second power source for supplying a second voltage, the second voltage being a voltage lower than the first voltage, the third switch and a fourth switch having a third capacitor and a fourth capacitor formed between both terminals thereof, respectively;

a first diode coupled in a backward direction between a contact of the first switch and the second switch and a third power source for supplying a third voltage, the third voltage being a voltage between the first and second voltages; and a second diode coupled in a forward direction between a contact of the third switch and the fourth switch and the third power source, wherein:

the first voltage and the second voltage being alternately applied to the first terminal of the panel capacitor when the first switch and the second switch, and the third switch and the fourth switch are alternately turned on, and the first capacitor has a lower capacitance than the second capacitor, and the third capacitor having a higher capacitance than the fourth capacitor.

2. The apparatus of claim 1, wherein the first switch, second switch, third switch and fourth switch each includes a field effect transistor, and the first capacitor, second capacitor, third capacitor and fourth capacitor each is a parasitic capacitor of the first switch, second switch, third switch and fourth switch, respectively.

3. The apparatus of claim 1, wherein the difference between the first voltage and the second voltage is a voltage necessary for a sustain of the panel capacitor.

4. The apparatus as claimed in claim 1, further comprising:

an inductor coupled to the first terminal of the panel capacitor, wherein the panel capacitor is substantially fully charged to the first voltage or the second voltage by a resonance between the inductor and the panel capacitor.

5. The apparatus of claim 1, wherein the second voltage is applied to a second terminal of the panel capacitor while the first voltage is applied to the first terminal of the panel capacitor, and the first voltage being applied to the second terminal of the panel capacitor while the second voltage is applied to the first terminal of the panel capacitor.

6. The apparatus of claim 5, further comprising:

a fifth switch and a sixth switch coupled in series between the first power source and the second terminal of the panel capacitor, the fifth switch and the sixth switch having a fifth capacitor and a sixth capacitor formed between both terminals thereof, respectively;

a seventh switch and an eighth switch coupled in series between the second terminal of the panel capacitor and the second power source, the seventh switch and the eighth switch having a seventh capacitor and an eighth capacitor formed between both terminals thereof, respectively;

a third diode coupled in a backward direction between a contact of the fifth switch and the sixth switch and the third power source; and a fourth diode coupled in a forward direction between a contact of the seventh switch and the eighth switch and the third source, wherein the fifth capacitor has a lower capacitance than the sixth capacitor, and the seventh capacitor having a higher capacitance than the eighth capacitor.

7. An apparatus for driving a plasma display panel, which is for applying a driving voltage to a panel capacitor formed between a first electrode and a second electrode, the apparatus comprising:

a first switch and a second switch coupled in series between a first power source for supplying a first voltage and a first terminal of the panel capacitor, the first switch and the second switch having a first capacitor and a second capacitor formed between both terminals thereof, respectively, wherein the first voltage and a second voltage are alternately applied to the first terminal of the panel capacitor, a first electric path is formed between the first switch and the second switch and a third voltage while the first and second switches are turned off to apply the second voltage to the first terminal of the panel capacitor, the third voltage being a voltage between the first and second voltages, and the first capacitor has a lower capacitance than the second capacitor.

8. The apparatus of claim 7, wherein the first switch and the second switch include field effect transistors, and the first capacitor and the second capacitor is a parasitic capacitor of the first switch and the second switch, respectively.

9. The apparatus of claim 7, further comprising:

a diode coupled between a contact of the first switch and the second switch and the third voltage so as to form the first electric path.

10. The apparatus of claim 7, further comprising:

a third and a fourth switch coupled in series between the first terminal of the panel capacitor and a second power source for supplying the second voltage, the third switch and the fourth switch having a third capacitor and a fourth capacitor formed between both terminals thereof, respectively, a second electric path being formed between a contact of the third switch and the fourth switch, and the third voltage while the third switch and the fourth switch are turned off to apply the first voltage to the first terminal of the panel capacitor, wherein the third capacitor has a higher capacitance than the fourth capacitor.

11. The apparatus of claim 7, further comprising:

a fifth switch and a sixth switch coupled in series between the first power source and a second terminal of the panel capacitor, the fifth switch and a sixth switch having a fifth capacitor and a sixth capacitor formed between both terminals thereof, respectively; and a seventh switch and an eighth switch coupled in series between the second terminal of the panel capacitor and the second power source, the seventh switch and the eighth switch having a seventh capacitor and an eighth capacitor formed between both terminals thereof, respectively, a third electric path being formed between a contact of the fifth switch and the sixth switch and the third voltage while the fifth switch and the sixth switch are turned off to apply the second voltage to the second terminal of the panel capacitor, a fourth electric path being formed between a contact of the seventh switch and the eighth switch and the third voltage while the seventh switch and the eighth switch are turned off to apply the first voltage to the second terminal of the panel capacitor, wherein the fifth capacitor has a lower capacitance than the sixth capacitor, and the seventh capacitor having a higher capacitance than the eighth capacitor.

12. The apparatus of claim 7, wherein the difference between the first voltage and the second voltage is a voltage necessary for a sustain of the panel capacitor, and the third voltage being a voltage between the first and second voltages.

13. The apparatus of claim 7, further comprising:

an inductor coupled to the first terminal of the panel capacitor; and a power recovery section for changing a voltage of the first terminal of the panel capacitor using a resonance between the inductor and the panel capacitor.

14. The apparatus of claim 13, wherein the power recovery section injects a current to the inductor using a voltage difference between the first voltage of the first power source and the third voltage, and causes the resonance while the current flows to the inductor.

15. A method for driving a plasma display panel, by alternately applying a first voltage and a second voltage to a panel capacitor formed between a first electrode and a second electrode, the method comprising:

turning off a first switch and a second switch coupled between a first terminal of the panel capacitor and a first power source for supplying the first voltage, and applying the second voltage to the first terminal of the panel capacitor; and forming a first electric path between a contact of the first switch and the second switch and a third voltage, the third voltage being a voltage between the first voltage and the second voltage, wherein a first capacitor formed between both terminals of the first switch has a lower capacitance than a second capacitor formed between both terminals of the second switch.

16. The method of claim 15, wherein the step of turning off comprises: applying the first voltage to a second terminal of the panel capacitor.

17. The method of claim 15, wherein the step of turning off the first switch and the second switch comprises:

turning on a third switch and a fourth switch to supply the second voltage to the first terminal of the panel capacitor, the third switch and the fourth switch being coupled in series between the first terminal of the panel capacitor and a second power source for supplying the second voltage.

18. The method of claim 17, further comprising:

turning off the third switch and the fourth switch and turning on the first switch and the second switch to apply the first voltage to the first terminal of the panel capacitor; and forming an electric path between a contact of the third switch and the fourth switch and the third voltage.

19. The method of claim 15, further comprising:

changing a voltage of the first terminal by using a resonance between the panel capacitor and an inductor coupled to the first terminal, prior to applying the second voltage to the first terminal of the panel capacitor.

20. The method of claim 19, further comprising:

injecting a current to the inductor by using a difference between the first voltage and the third voltage, prior to the step of changing a voltage of the first terminal.

* * * * *